(12) United States Patent
Laberteaux et al.

(10) Patent No.: US 6,337,907 B1
(45) Date of Patent: *Jan. 8, 2002

(54) ECHO CANCELLER EMPLOYING DUAL-H ARCHITECTURE HAVING IMPROVED COEFFICIENT TRANSFER

(75) Inventors: Kenneth P. Laberteaux, South Bend; Richard C. Younce, Wakarush, both of IN (US)

(73) Assignee: Tellabs Operations, Inc., Lisle, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/717,932

(22) Filed: Nov. 21, 2000

Related U.S. Application Data

(63) Continuation of application No. 08/970,230, filed on Nov. 14, 1997, now Pat. No. 6,181,793.

(51) Int. Cl.$^7$ ............................................... H04M 1/00
(52) U.S. Cl. ............................... 379/406.08; 370/290
(58) Field of Search ......................... 379/406, 410, 379/411, 407–409, 345, 406.08, 406.01, 406.05; 370/287, 290, 291; 708/322

(56) References Cited

U.S. PATENT DOCUMENTS

| | | | |
|---|---|---|---|
| 3,787,645 A | 1/1974 | Ochiai et al. ............. 179/170.2 |
| 4,064,378 A | 12/1977 | Kitayama et al. ......... 179/170.2 |
| 4,554,417 A | 11/1985 | Boyer ...................... 179/170.2 |
| 4,574,166 A | 3/1986 | Gritton .................... 179/170.2 |
| 4,608,464 A | 8/1986 | Morikawa et al. ....... 179/170.2 |
| 4,621,172 A | 11/1986 | Kanemasa et al. ......... 370/32.1 |
| 4,628,156 A | 12/1986 | Irvin ......................... 379/410 |
| 4,633,046 A | 12/1986 | Kitayama et al. .......... 370/32.1 |
| 4,707,284 A | 11/1987 | Goldblatt et al. .......... 252/32.7 |
| 4,805,215 A | 2/1989 | Miller ........................ 379/411 |
| 4,918,727 A * | 4/1990 | Rohrs et al. ................ 379/410 |
| 5,274,705 A * | 12/1993 | Younce et al. .............. 379/410 |
| 5,644,635 A * | 7/1997 | Armbruster ................ 379/410 |
| 5,663,955 A * | 9/1997 | Iyengar ..................... 379/411 |
| 5,664,011 A * | 9/1997 | Crochiere et al. .......... 379/410 |
| 5,745,564 A * | 4/1998 | Meek ......................... 379/406 |
| 5,796,819 A * | 8/1998 | Romesburg ................ 379/406 |
| 5,812,537 A * | 9/1998 | Betts et al. ................. 379/410 |
| 5,828,756 A * | 10/1998 | Benesty et al. ............. 379/410 |
| 6,181,793 B1 * | 1/2001 | Laberteaux et al. ........ 379/406 |

* cited by examiner

*Primary Examiner*—Wing F. Chan
(74) *Attorney, Agent, or Firm*—McAndrews, Held & Malloy, Ltd.

(57) ABSTRACT

An echo canceller circuit for use in an echo canceller system is set forth. The echo canceller circuit comprises a first digital filter having non-adaptive tap coefficients to simulate an echo response occurring during a call. A second digital filter having adaptive tap coefficients to simulate an echo response occurring during the call is also used. The adaptive tap coefficients of the second digital filter are updated over the duration of the call. A coefficient transfer controller is disposed in the echo canceller circuit to transfer the adaptive tap coefficients of the second digital filter to replace the tap coefficients of the first digital filter when a value, $\hat{E}$, is greater than a value, $\bar{E}$, and, concurrently, when $\hat{E}$ is greater than a value, $E_{max}$. The value of $\bar{E}$ corresponds to the ratio between a signal-plus-echo signal and a first echo compensated signal using the first digital filter. The value of $\hat{E}$ corresponds to the ratio between the signal-plus-echo signal and a second echo compensated signal using the second digital filter. The value of $E_{max}$ corresponds to the largest $\hat{E}$ experienced over at least a portion of the duration of the call and at which a transfer occurred.

51 Claims, 5 Drawing Sheets

ECHO CANCELLER EMPLOYING DUAL-H ARCHITECTURE HAVING IMPROVED COEFFICIENT TRANSFER

CROSS-REFERENCE TO RELATED APPLICATIONS

This is a continuation of U.S. Ser. No. 08/970,230, filed Nov. 14, 1997 now U.S. Pat. No. 6,181,793. The following applications, filed on even date, herewith, are incorporated by reference: U.S. Ser. No. 08/971,116 "Echo Canceller Employing Dual-H Architecture Having Improved Double-Talk Detection;" U.S. Ser. No. 08/970,228, "Echo Canceller Employing Dual-H Architecture Having Improved Non-Linear Echo Path Detection;" U.S. Ser. No. 08/970,874, "Echo Canceller Employing Dual-H Architecture Having Variable Adaptive Gain Settings;" U.S. Ser. No. 08/970,639, "Echo Canceller Employing Dual-H Architecture Having Improved Non-Linear Processor;" U.S. Ser. No. 08/970,229 "Echo Canceller Employing Dual-H Architecture Having Split Adaptive Gain Settings."

STATEMENT REGARDING FEDERALLY SPONSORED RESEARCH OR DEVELOPMENT

Not Applicable

BACKGROUND OF THE INVENTION

Long distance telephone facilities usually comprise four-wire transmission circuits between switching offices in different local exchange areas, and two-wire circuits within each area connecting individual subscribers with the switching office. A call between subscribers in different exchange areas is carried over a two-wire circuit in each of the areas and a four-wire circuit between the areas, with conversion of speech energy between the two and four-wire circuits being effected by hybrid circuits. Ideally, the hybrid circuit input ports perfectly match the impedances of the two and four-wire circuits, and its balanced network impedance perfectly matches the impedance of the two-wire circuit. In this manner, the signals transmitted from one exchange area to the other will not be reflected or returned to the one area as echo. Unfortunately, due to impedance differences which inherently exist between different two and four-wire circuits, and because impedances must be matched at each frequency in the voice band, it is virtually impossible for a given hybrid circuit to perfectly match the impedances of any particular two and four-wire transmission circuit. Echo is, therefore, characteristically part of a long distance telephone system.

Although undesirable, echo is tolerable in a telephone system so long as the time delay in the echo path is relatively short, for example, shorter than about 40 milliseconds. However, longer echo delays can be distracting or utterly confusing to a far end speaker, and to reduce the same to a tolerable level an echo canceller may be used toward each end of the path to cancel echo which otherwise would return to the far end speaker. As is known, echo cancellers monitor the signals on the receive channel of a four-wire circuit and generate estimates of the actual echoes expected to return over the transmit channel. The echo estimates are then applied to a subtractor circuit in the transmit channel to remove or at least reduce the actual echo.

In simplest form, generation of an echo estimate comprises obtaining individual samples of the signal on the receive channel, convolving the samples with the impulse response of the system and then subtracting, at the appropriate time, the resulting products or echo estimates from the actual echo on the transmit channel. In actual practice generation of an echo estimate is not nearly so straightforward.

Transmission circuits, except those which are purely resistive, exhibit an impulse response that has amplitude and phase dispersive characteristics that are frequency dependent, since phase shift and amplitude attenuation vary with frequency. To this end, a suitable known technique for generating an echo estimate contemplates manipulating representations of a plurality of samples of signals which cause the echo and samples of impulse responses of the system through a convolution process to obtain an echo estimate which reasonably represents the actual echo expected on the echo path. One such system is illustrated in FIG. 1.

In the system illustrated in FIG. 1. a far end signal x from a remote telephone system is received locally at line 10. As a result of the previously noted imperfections in the local system, a portion of the signal x is echoed back to the remote site at line 15 along with the signal v from the local telephone system. The echo response is illustrated here as a signal s corresponding to the following equation:

$$s = x * h$$

where h is the impulse response of the echo characteristics. As such, the signal sent from the near end to the far end, absent echo cancellation, is the signal y, which is the sum of the telephone signal v and the echo signal s. This signal is illustrated as v at line 15 of FIG. 1.

To reduce and/or eliminate the echo signal component s from the signal y, the system of FIG. 1 uses an echo canceller having an impulse response filter $\bar{h}$ that is the estimate of the impulse echo response h. As such, a further signal $\bar{s}$ representing an estimate of echo signal s is generated by the echo canceller in accordance with the following equation:

$$\bar{s} = \bar{h} * x$$

The echo canceller subtracts the echo estimate signal $\bar{s}$ from the signal s to generate a signal e at line 20 that is returned to the far end telephone system. The signal e thus corresponds to the following equation:

$$e = s + v - \bar{s} \approx v$$

As such, the signal returned to the far end station is dominated by the signal v of the near end telephone system. As the echo impulse response $\bar{h}$ more closely correlates to the actual echo response h, then $\bar{s}$ more closely approximates s and thus the magnitude of the echo signal component s on the signal e is more substantially reduced.

The echo impulse response model $\bar{h}$ may be replaced by an adaptive digital filter having an impulse response $\hat{h}$. Generally, the tap coefficients for such an adaptive response filter are found using a technique known as Normalized Least Mean Squares adaptation, although other Mean Squares processes may also be used (e.g., RLS, NLMS, etc.).

Although such an adaptive echo canceller architecture provides the echo canceller with the ability to readily adapt to changes in the echo path response h, it is highly susceptible to generating sub-optimal echo cancellation responses in the presence of "double talk" (a condition that occurs when both the speaker at the far end and the speaker at the near end are speaking concurrently as determined from the viewpoint of the echo canceller).

To reduce this sensitivity to double-talk conditions, it has been suggested to use both a non-adaptive response and an adaptive response filter in a single echo canceller. One such echo canceller is described in U.S. Pat. No. 3,787,645, issued to Ochiai et al on Jan. 22, 1974. Such an echo canceller is now commonly referred to as a dual-H echo canceller.

Although the dual-H echo canceller architecture of the '645 patent provides substantial improvements over the use of a single filter response architecture, the '645 patent is deficient in many respects and lacks certain teachings for optimizing the use of such a dual-H architecture in a practical echo canceller system. The present inventors have recognized the problems associated with the foregoing dual-H architecture and have provided solutions to these problems.

BRIEF SUMMARY OF THE INVENTION

An echo canceller circuit for use in an echo canceller system is set forth. The echo canceller circuit comprises a first digital filter having non-adaptive tap coefficients to simulate an echo response occurring during a call. A second digital filter having adaptive tap coefficients to simulate an echo response occurring during the call is also used. The adaptive tap coefficients of the second digital filter are updated over the duration of the call. A coefficient transfer controller is disposed in the echo canceller circuit to transfer the adaptive tap coefficients of the second digital filter to replace the tap coefficients of the first digital filter when a value, $\hat{E}$, is greater than a value, $\overline{E}$, and, concurrently, when $\hat{E}$ is greater than a value, $E_{max}$. The value of $\overline{E}$ corresponds to the ratio between a signal-plus-echo signal and a first echo compensated signal using the first digital filter. The value of $\hat{E}$ corresponds to the ratio between the signal-plus-echo signal and a second echo compensated signal using the second digital filter. The value of $E_{max}$ corresponds to the largest $\hat{E}$ experienced over at least a portion of the duration of the call at which a transfer occurred.

A method for transferring tap coefficients between an adaptive digital filter and a non-adaptive digital filter of a dual-H echo canceller during a call is also set forth. According to the method, a comparison is made between the value of $\hat{E}$ and the value of $\overline{E}$. Further, a comparison is also made between the value of $\hat{E}$ the value of $E_{max}$. Transfer of the adaptive tap coefficients of the adaptive digital filter to replace the tap coefficients of the non-adaptive digital filter occurs when $\hat{E}$ is greater than $\overline{E}$ and, concurrently, $\hat{E}$ is greater than $E_{max}$.

DETAILED DESCRIPTION OF THE INVENTION

Figure 1:
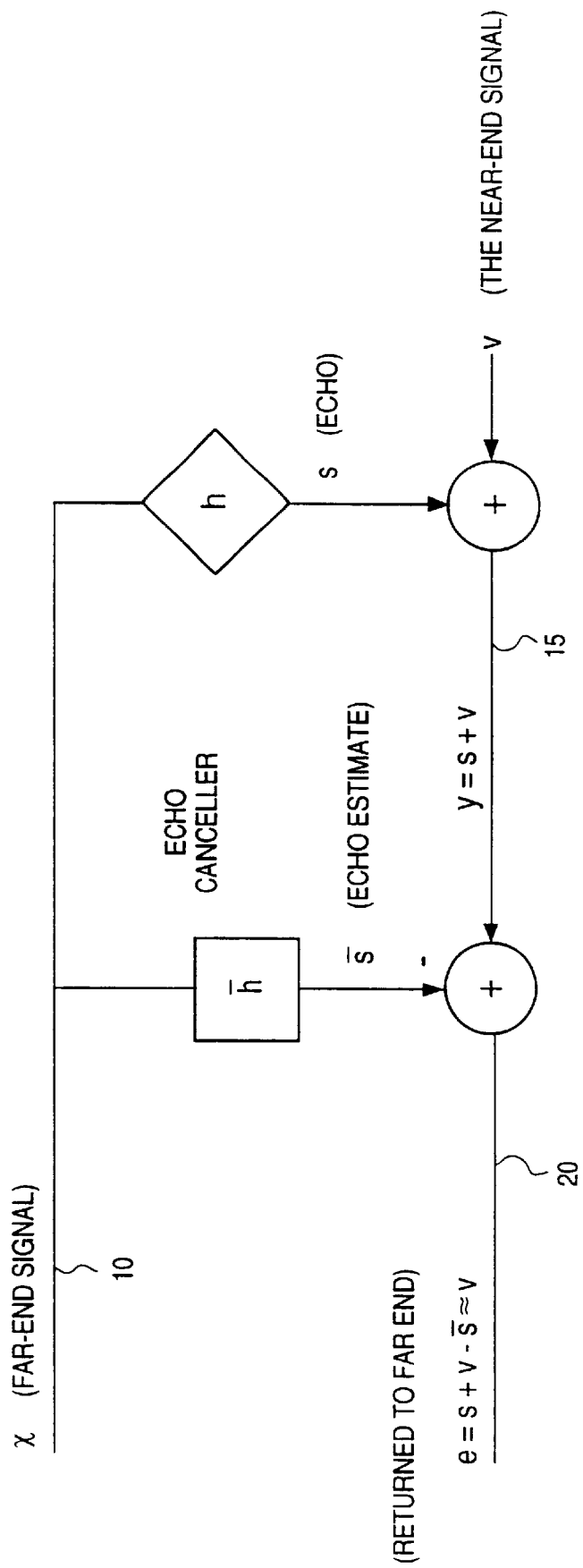
FIG. 1 is a block diagram of a conventional canceller.
Figure 2:
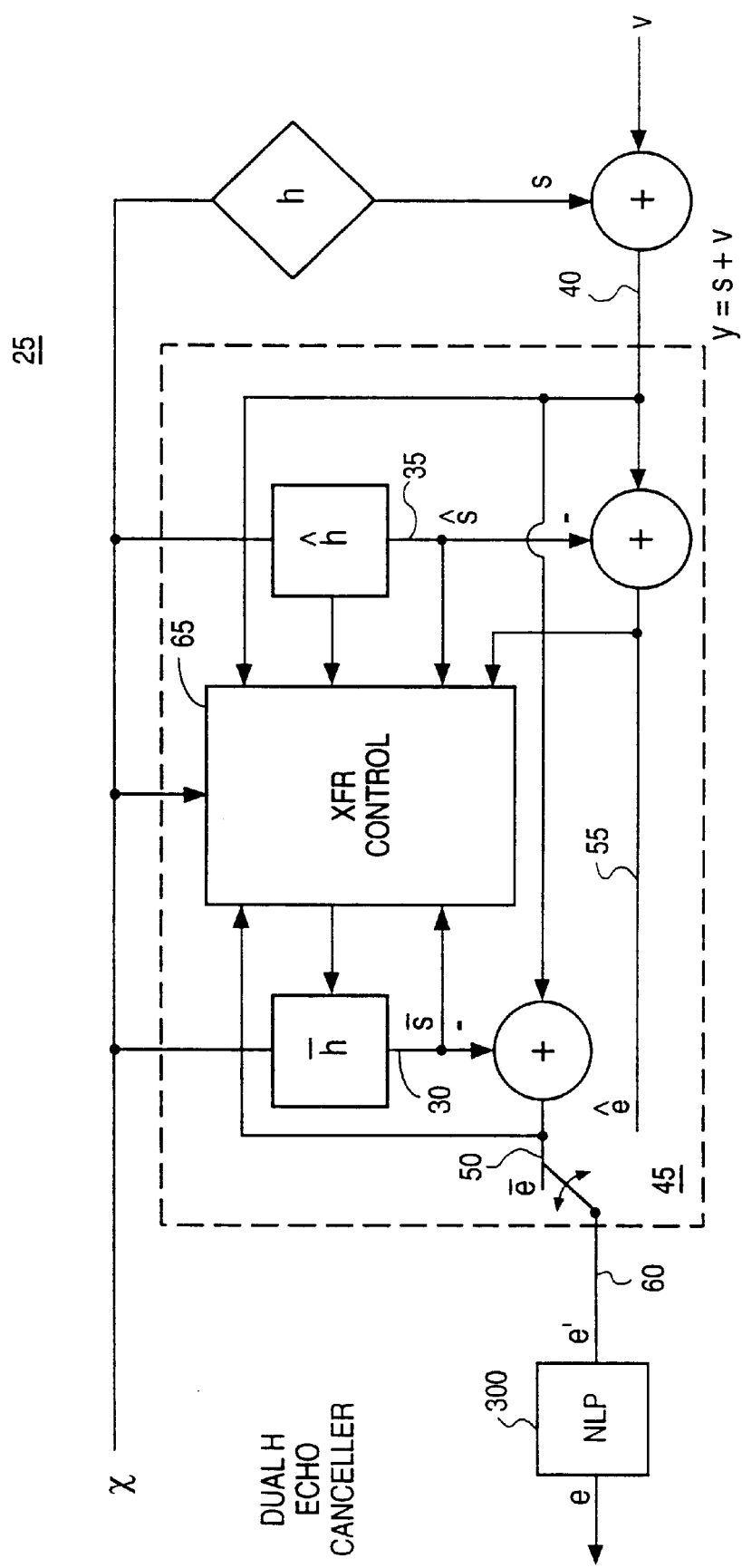
FIG. 2 is a schematic block diagram of an echo canceller that operates in accordance with one embodiment of the present invention.

FIG. 2 illustrates one embodiment of a dual-h echo canceller suitable for use in implementing the present invention. As illustrated, the echo canceller, shown generally at 25, includes both a non-adaptive filter $\overline{h}$ and an adaptive filter $\hat{h}$ to model the echo response h. Each of the filters $\overline{h}$ and $\hat{h}$ are preferably implemented as digital filters, such as finite impulse response (FIR) filters comprising a plurality of taps each having a corresponding tap coefficient. This concept may be extended to IIR filters as well. If FIR filters are used, the duration of each of the FIR filters should be sufficient to cover the duration of the echo response of the channel in which the echo canceller 25 is disposed.

The output of the non-adaptive filter $\overline{h}$ is available at the line 30 while the output of the adaptive filter $\hat{h}$ is available at line 35. Each of the signals at lines 30 and 35 are subtracted from the signal-plus-echo signal of line 40 to generate echo compensated signals at lines 50 and 55, respectively. A switch 45, preferably a software switch, may be used to selectively provide either the output signal at the line 50 or the output signal at line 55 to the echo canceller output at line 60. The switch 45 may be used to provide the echo compensation based on the $\hat{h}$ filter during convergence and then be switched to provide the echo compensation based on the h filter after convergence. Further, the switch 45 is directed to provide the echo compensation based on the $\overline{h}$ filter in response to the detection of a double-talk condition.

A transfer controller 65 is used to transfer the tap coefficients of filter $\hat{h}$ to replace the tap coefficients of filter $\overline{h}$. As illustrated, the transfer controller 65 is connected to receive a number of system input signals. Of particular import with respect to the present invention, the transfer controller 65 receives the signal-plus-echo response y and each of the echo canceller signals $\overline{e}$ and $\hat{e}$ at lines 50 and 55, respectively. The transfer controller 65 is preferably implemented in the software of one or more digital signal processors used to implement the echo canceller 25.

As noted above, the art is substantially deficient of teachings with respect to the manner in which and conditions under which a transfer of tap coefficients from $\hat{h}$ to $\overline{h}$ is to occur. The present inventors have implemented a new process and, as such, a new echo canceller in which tap coefficient transfers are only made by the transfer controller 65 when selected criterion are met. The resulting echo canceller 25 has substantial advantages with respect to reduced double-talk sensitivity and increased double-talk detection capability. Further, it ensures a monotonic improvement in the estimates $\overline{h}$.

The foregoing system uses a parameter known as echo-return-loss-enhancement (ERLE) to measure and keep track of system performance. Two ERLE parameter values are used in the determination as to whether the transfer controller 65 transfers the tap coefficients from $\hat{h}$ to $\overline{h}$. The first parameter, $\overline{E}$, is defined in the following manner:

$$\overline{E} = \frac{y}{\overline{e}}$$

Similarly, the parameter $\hat{E}$ is defined as follows:

$$\hat{E} = \frac{y}{\hat{e}}$$

Each of the values $\hat{E}$ and $\overline{E}$ may also be averaged over a predetermined number of samples to arrive at averaged $\hat{E}$ and $\overline{E}$ values used in the system for the transfer determinations.

Figure 3:
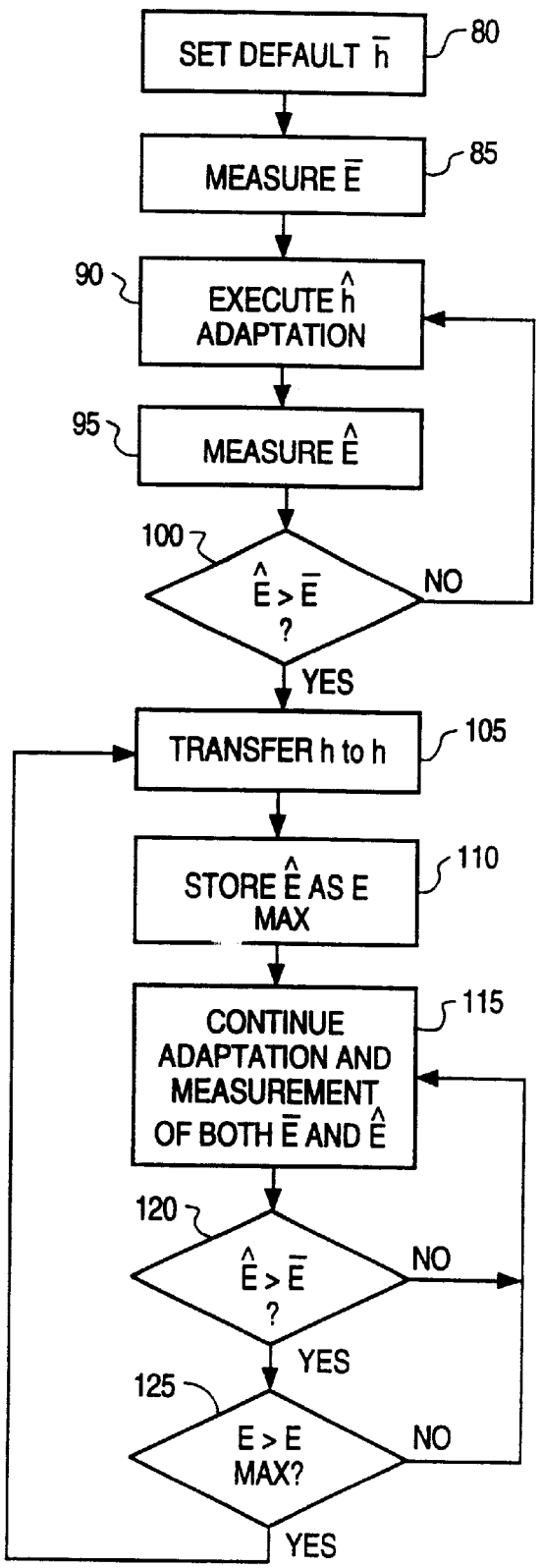
FIG. 3 is a flow chart illustrating one manner of carrying out coefficient transfers in accordance with one embodiment of the present invention.

FIG. 3 illustrates one manner of implementing the echo canceller 25 using the parameters $\hat{E}$ and $\overline{E}$ to control tap coefficients transfers between filter $\hat{h}$ to $\overline{h}$. As illustrated, the echo canceller 25 provides a default $\overline{h}$ set of coefficients at step 80 during the initial portions of the call. After the tap coefficients values for $\overline{h}$ have been set, a measure of $\overline{E}$ is made at step 85 to measure the performance of the tap coefficient values of filter $\overline{h}$.

After the initialization sequence of steps 80 and 85, or concurrent therewith, the echo canceller 25 begins and continues to adapt the coefficients of $\hat{h}$ to more adequately match the echo response h of the overall system. As noted in FIG. 3. this operation occurs at step 90. Preferably, the adaptation is made using a Normalized Least Mean Squares method, although other adaptive methods may also be used (e.g., LMS and RLS).

After a period of time has elapsed, preferably, a predetermined minimum period of time, the echo canceller 25 makes a measure of $\hat{E}$ at step 95. Preferably, this measurement is an averaged measurement. At step 100, the echo canceller 25 compares the value of $\hat{E}$ with the value of $\overline{E}$. If the value of $\hat{E}$ is greater than the value of $\overline{E}$, the tap coefficients of filter $\hat{h}$ are transferred to replace the tap coefficients of filter $\overline{h}$ at step 105. If this criterion is not met, however, the echo canceller 25 will continue to adapt the coefficients of the adaptive filter $\hat{h}$ at step 90, periodically measure the value of $\hat{E}$ at step 95, and make the comparison of step 100 until the condition is met.

Although not illustrated, other transfer conditions may be imposed in addition to the foregoing. For example, the echo canceller may impose a requirement that a far end signal exist before a transfer may occur. Additionally, transfers may be inhibited during a double-talk condition. Further conditions may also be imposed based on system requirements.

If the echo canceller 25 finds that $\hat{E}$ is greater than $\overline{E}$, the above-noted transfer takes place. Additionally, the echo canceller 25 stores the value of $\hat{E}$ as a value $E_{max}$. This operation is depicted at step 110 of the FIG. 3. The value of $E_{max}$ is thus the maximum value of ERLE that occurs over the duration of the call and at which a transfer has taken place. This further value is used thereafter, in addition to the $\hat{E}$ and $\overline{E}$ comparison, to control whether the tap coefficients of $\hat{h}$ are transferred by the transfer controller 65 to replace the tap coefficients of $\overline{h}$. This further process is illustrated that steps 115, 120, and 125 of FIG. 3. In each instance, the tap coefficient transfer only occurs when both of the following two conditions are met: 1) $\hat{E}$ is greater than the current $\overline{E}$, and 2) $\hat{E}$ is greater than any previous value of $\overline{E}$ used during the course of the call. ($\hat{E}$ is greater than $E_{max}$). Each time that both criteria are met, the transfer controller 65 of echo canceller 25 executes the tap coefficient transfer and replaces the previous $E_{max}$ value with the current $\hat{E}$ value for future comparison.

Requiring that $\hat{E}$ be greater than any $\overline{E}$ value used over the course of the call before the coefficient transfer takes place has two beneficial and desirable effects. First, each transfer is likely to replace the prior tap coefficients of filter $\overline{h}$ with a better estimate of the echo path response. Second, this transfer requirement increases the double-talk protection of the echo canceller system. Although it is possible to have positive ERLE $\hat{E}$ during double-talk, the probability that $\hat{E}$ is greater than $E_{max}$ during double-talk decreases as the value of $E_{max}$ increases. Thus an undesirable coefficient transfer during double-talk becomes increasingly unlikely as the value of $E_{max}$ increases throughout the duration of the call.

The echo canceller 25 may impose both an upper boundary and a lower boundary on the value of $E_{max}$. For example, $E_{max}$ may have a lower bounded value of 6 dB and an upper bounded value of 24 dB. The purpose of the lower bound is to prevent normal transfers during double-talk conditions. It has been shown in simulations using speech inputs that during double-talk, a value of greater than 6 dB ERLE was a very low probability event, thus making it an appropriate value for the initial value of $E_{max}$. The upper bound on $E_{max}$ is used to prevent a spuriously high measurement from setting $E_{max}$ to a value at which further transfers become impossible.

The value of $E_{max}$ should be set to, for example, the lower bound value at the beginning of each call. Failure to do so will prevent tap coefficient transfers on a new call until the echo cancellation response of the echo canceller 25 on the new call surpasses the quality of the response existing at the end of the prior call. However, this criterion may never be met during the subsequent call Thereby causing the echo canceller 25 to operate using sub-optimal tap coefficients values. Resetting the $E_{max}$ value to a lower value increases the likelihood that a tap coefficient transfer will take place and, thereby, assists in ensuring that the $\overline{h}$ filter uses tap coefficients for echo cancellation that more closely correspond to the echo path response of the new call.

Figure 4:
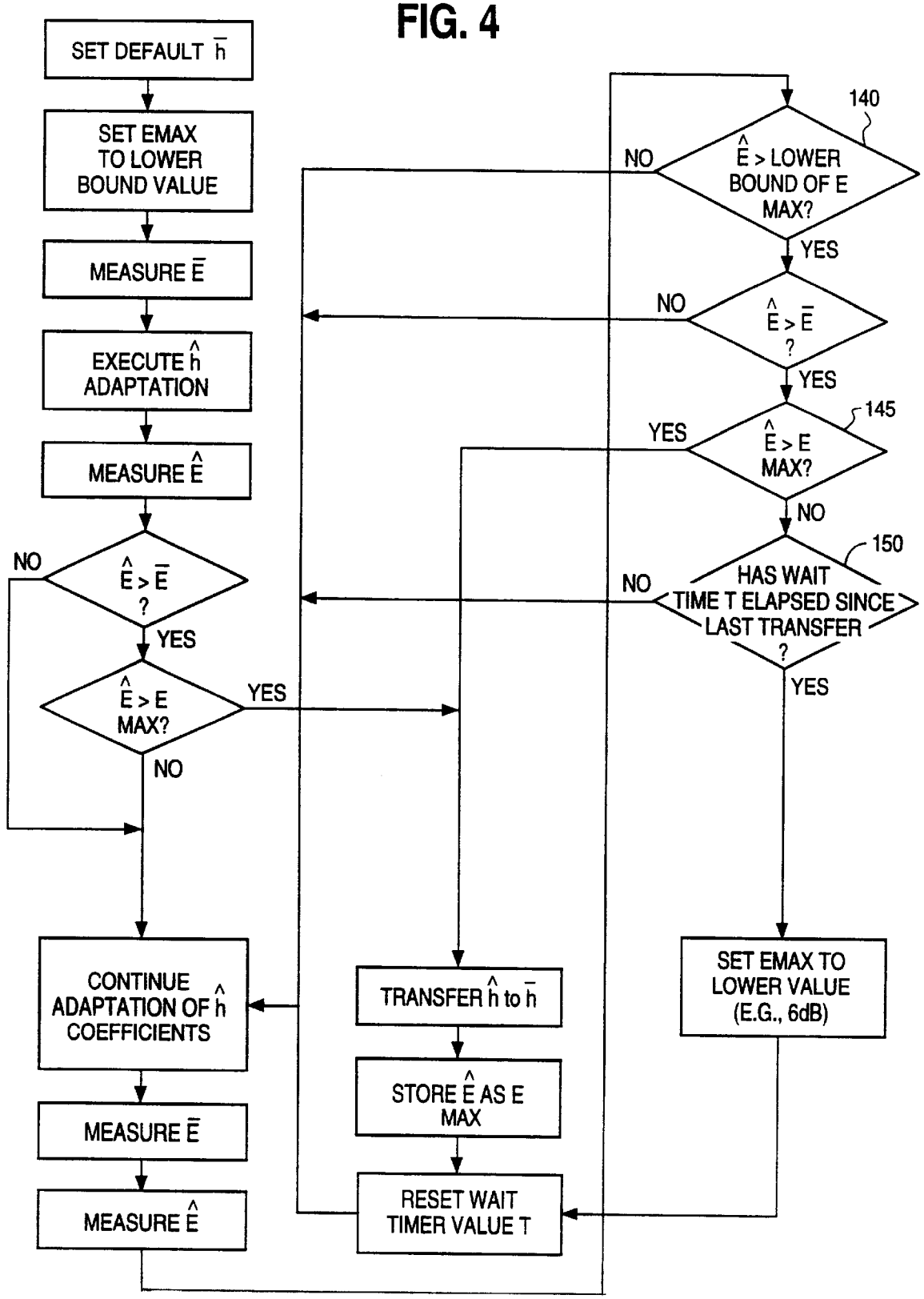
FIG. 4 is a flow chart illustrating a further manner of carrying out coefficient transfers in accordance with a further embodiment of the present invention.

One manner of implementing the $E_{max}$ value change is illustrated in the echo canceller operations flow-chart of FIG. 4. When all transfer conditions are met except $\hat{E}$ greater than $E_{max}$, and this condition persists for a predetermined duration of time, the echo canceller 25 will reset the $E_{max}$ value to, for example, the lower bound value. In the exemplary operations shown in FIG. 4. the echo canceller 25 determines whether $\hat{E}$ is greater than the lower bound of $E_{max}$ at step 140 and less than the current value of $E_{max}$ at step 145. If both of these condition remain true for a predetermined period of time as determined at step 150, and all other transfer criterion have been met, the echo canceller 25 resets the $E_{max}$ value to a lower value, for example, the lower bound of the $E_{max}$ value, at step 155. This lowering of the $E_{max}$ value increases the likelihood of a subsequent tap coefficient transfer.

Choosing values for the lower and upper bound of $E_{max}$ other than 6 dB and 24 dB, respectively, is also possible in the present system. Choosing a lower bound of $E_{max}$ smaller than 6 dB provides for a relatively prompt tap coefficient transfer after a reset operation or a new call, but sacrifices some double-talk protection. A value greater than 6 dB, however, inhibits tap coefficient transfer for a longer period of time, but increases the double-talk immunity of the echo canceller. Similarly, varying the value of the predetermined wait time T before which $E_{max}$ is reset may also be used to adjust echo canceller performance. A shorter predetermined wait time T produces faster reconvergence transfers, but may sacrifice some double-talk immunity. The opposite is true for larger predetermined wait time values.

A further modification of the foregoing echo canceller system relates to the value stored as $E_{max}$ at the instant of tap coefficient transfer. Instead of setting $E_{max}$ equal to the $\hat{E}$ value at the transfer instant, $E_{max}$ may be set to a value equal to the value of $\hat{E}$ minus a constant value (e.g., one, three, or 6 dB). At no time, however, should the $E_{max}$ value be set to a value that is below the lower bound value for $E_{max}$. Additionally, a further condition may be imposed in that a new softened $E_{max}$ is not less than the prior value of $E_{max}$. The foregoing "softening" of the $E_{max}$ value increases the number of transfers that occur and, further, provides more decision-making weight to the condition of $\hat{E}$ being larger than $\overline{E}$.

As will be readily recognized, the echo canceller of the present invention may be implemented in a wide range of manners. Preferably, the echo canceller system is implemented using one or more digital signal processors to carry out the filter and transfer operations. Digital-to-analog conversions of various signals are carried out in accordance with known techniques for use by the digital signal processors.

There are some circumstances when the foregoing transfer criterion should be defeated. For example, the transfer criterion is preferably defeated when 1) the long-term ERLE remains low, and 2) a small but measurable performance advantage of $\hat{h}$ over $\overline{h}$ is sustained over a long period of time.

One case in which it should be defeated is when the steady-state ERLE remains below the lower value of $E_{max}$. Such a case may occur when there is a high-level, constant background noise entering from the near-end. Since the foregoing process prevents transfers from occurring unless the ERLE is greater than the lower bound of $E_{max}$, no transfers are possible in low ERLE situations. Since the $\overline{h}$ may contain the solution to a previous call at the start of a new, low ERLE call, defeating the foregoing transfer criterion is preferable in some cases.

The first condition for defeating the foregoing transfer criterion is a sustained low ERLE measurement over a relatively long period of time (e.g. 150 to 500 msec) of adaptation. Since a low ERLE call will tend to have a smaller difference between the ERLEs of $\overline{h}$ and $\hat{h}$ (a 1 dB difference may be the largest difference observed), the required ERLE difference between $\hat{h}$ and $\overline{h}$ for a transfer to occur should be reduced (e.g. to 0 or 1 dB) once the long-term ERLE is confirmed to be low. To compensate, a requirement may be imposed whereby the small ERLE difference between $\overline{h}$ and $\hat{h}$ is maintained for a long period of time (e.g. 75 to 200 msec) before the transfer is allowed.

Figure 5:
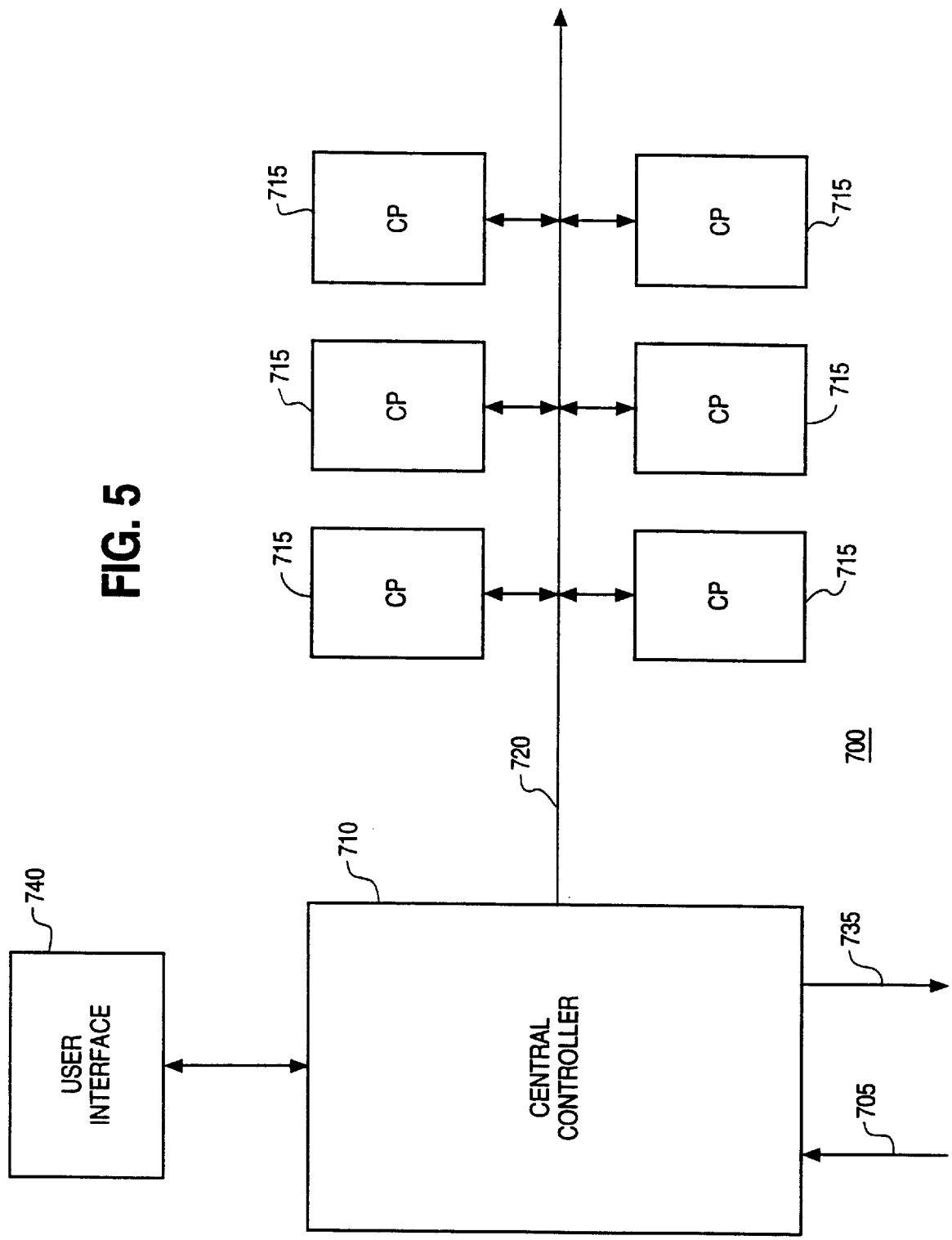
FIG. 5 illustrates one manner of implementing an echo canceller system employing the present invention.

FIG. 5 illustrates one embodiment of an echo canceller system, shown generally at 700, that maybe used to cancel echoes in multi-channel communication transmissions. As illustrated, the system 700 includes an input 705 that is connected to receive a multi-channel communications data, such as a T1 transmission. A central controller 710 deinterleaves the various channels of the transmission and provides them to respective convolution processors 715 over a data bus 720. It is within the convolution processors 715 that a majority of the foregoing operations take place. Each convolution processor 715 is designed to process at least one channel of the transmission at line 730. After each convolution processor 715 has processed its respective channel(s), the resulting data is placed on the data bus 720. The central controller 710 multiplexes the data into the proper multi-channel format (e.g., T1) for retransmission at line 735. User interface 740 is provided to set various user programmable parameters of the system.

Numerous modifications may be made to the foregoing system without departing from the basic teachings thereof. Although the present invention has been described in substantial detail with reference to one or more specific embodiments, those of skill in the art will recognize that changes may be made thereto without departing from the scope and spirit of the invention as set forth in the appended claims.

What is claimed is:

1. An echo canceller arranged to reduce an echo signal component of a local communication signal during a call, the echo signal component resulting from a far end communication signal, the canceller comprising:
    a first filter comprising non-adaptive tap coefficients arranged to generate a first estimated signal estimating the echo signal component;
    a second filter comprising adaptive tap coefficients arranged to generate a second estimated signal estimating the echo signal component, the adaptive tap coefficients being updated during the call;
    an arithmetic unit combining the local communication signal including the echo signal component with the first estimated signal to generate a first echo compensated signal and combining the local communication signal including the echo signal component with the second estimated signal to generate a second echo compensated signal; and
    a transfer controller transferring at least some of the adaptive tap coefficients to replace at least some of the non-adaptive tap coefficients when $\hat{E}$ is greater than $\overline{E}$ and, concurrently, $\hat{E}$ is greater than $E_{max}$, wherein $\overline{E}$ is derived from a ratio of the local communication signal including the echo signal component and the first echo compensated signal, $\hat{E}$ is derived from a ratio of the local communication signal including the echo signal component and the second echo compensated signal, and $E_{max}$ is derived from a larger than average $\hat{E}$ value experienced over at least a portion of the duration of the call during which a transfer occurred.

2. An echo canceller as claimed in claim 1 wherein the value of $E_{max}$ is lowered if a transfer of coefficients has not taken place within a predetermined period of time.

3. An echo canceller as claimed in claim 1 wherein the value of $\hat{E}$ comprises an averaged value.

4. An echo canceller as claimed in claim 1 wherein the value of $\overline{E}$ comprises an averaged value.

5. An echo canceller as claimed in claim 1 wherein the $E_{max}$ value comprises the largest $\hat{E}$ value experienced over at least a portion of the duration of the call during which a transfer occurred.

6. An echo canceller as claimed in claim 1 wherein the arithmetic unit comprises means for performing subtraction.

7. An echo canceller for reducing an echo signal component of a local communication signal during a call, the echo signal component resulting from a far end communication signal, the canceller comprising:
    first means comprising non-adaptive tap coefficients for generating a first estimated signal estimating the echo signal component;
    second means comprising adaptive tap coefficients arranged to generate a second estimated signal estimating the echo signal component, the adaptive tap coefficients being updated during the call;
    means for combining the local communication signal including the echo signal component with the first estimated signal to generate a first echo compensated signal and for combining the local communication signal including the echo signal component with the second estimated signal to generate a second echo compensated signal; and
    means for transferring at least some of the adaptive tap coefficients to replace at least some of the non-adaptive tap coefficients when $\hat{E}$ is greater than $\overline{E}$ and, concurrently, $\hat{E}$ is greater than $E_{max}$, wherein $\overline{E}$ is derived from a ratio of the local communication signal including the echo signal component and the first echo compensated signal, $\hat{E}$ is derived from a ratio of the local communication signal including the echo signal component and the second echo compensated signal, and $E_{max}$ is derived from a larger than average $\hat{E}$ value experienced over at least a portion of the duration of the call during which a transfer occurred.

8. An echo canceller as claimed in claim 7 wherein the value of $E_{max}$ is lowered if a transfer of coefficients has not taken place within a predetermined period of time.

9. An echo canceller as claimed in claim 7 wherein the value of $\hat{E}$ comprises an averaged value.

10. An echo canceller as claimed in claim 7 wherein the value of $\overline{E}$ comprises an averaged value.

11. An echo canceller as claimed in claim 7 wherein the $E_{max}$ value comprises the largest $\hat{E}$ value experienced over at least a portion of the duration of the call during which a transfer occurred.

12. An echo canceller as claimed in claim 7 wherein the means for combining comprises means for performing an arithmetic calculation.

13. An echo canceller as claimed in claim 12 wherein the arithmetic calculation comprises subtraction.

14. An echo canceller circuit comprising:
a first digital filter having non-adaptive tap coefficients to simulate an echo response occurring during a call;
a second digital filter having adaptive tap coefficients to simulate an echo response occurring during the call, the adaptive tap coefficients being updated during the call;
a coefficient transfer controller disposed to transfer the adaptive tap coefficients of the second digital filter to replace the tap coefficients of the first digital filter when $\hat{E}$ is greater than $\overline{E}$ and, concurrently, $\hat{E}$ is greater than $E_{max}$, wherein $\overline{E}$ corresponds to the ratio between a signal-plus-echo signal and a first echo compensated signal using the first digital filter, $\hat{E}$ corresponds to the ratio between the signal-plus-echo signal and a second echo compensated signal using the second digital filter, and $E_{max}$ corresponds to the largest $\hat{E}$ value experienced over at least a portion of the duration of the call during which a transfer occurred.

15. An echo canceller circuit as claimed in claim 1 and further comprising:
a first summer circuit for subtracting a filtered output signal of the first digital filter from the signal-plus-echo signal to generate the first echo compensated signal; and
a second summer circuit for subtracting a filtered output signal of the second digital filter from the signal-plus-echo signal to generate the second echo compensated signal.

16. An echo canceller circuit as claimed in claim 15 and further comprising a switch for selectively providing either the first echo compensated signal or the second echo compensated signal to an output of an echo canceller.

17. An echo canceller circuit as claimed in claim 1 wherein the value of $E_{max}$ is lowered if a transfer of coefficients has not taken place within a predetermined period of time.

18. An echo canceller circuit as claimed in claim 1 wherein the value of $\hat{E}$ is an averaged value.

19. An echo canceller circuit as claimed in claim 1 wherein the value of $\hat{E}$ is an averaged value.

20. An echo canceller comprising:
first means comprising non-adaptive tap coefficients for simulating an echo response occurring during a call;
second means comprising adaptive tap coefficients for simulating an echo response occurring during the call and for updating the adaptive tap coefficients during the call; and
means for transferring the adaptive tap coefficients to replace the non-adaptive tap coefficients when $\hat{E}$ is greater than $\overline{E}$ and, concurrently, $\hat{E}$ is greater than $E_{max}$, wherein $\overline{E}$ corresponds to the ratio between a signal-plus-echo signal and a first echo compensated signal using the first means, $\hat{E}$ corresponds to the ratio between the signal-plus-echo signal and a second echo compensated signal using the second means, and $E_{max}$ corresponds to a larger than average $\hat{E}$ value experienced over at least a portion of the duration of the call during which a transfer occurred.

21. An echo canceller as claimed in claim 20 and further comprising means for subtracting an output signal of the first means from the signal-plus-echo signal to generate the first echo compensated signal and for subtracting an output signal of the second means from the signal-plus-echo signal to generate the second echo compensated signal.

22. An echo canceller as claimed in claim 21 and further comprising means for selectively providing either the first echo compensated signal or the second echo compensated signal to an output of the echo canceller.

23. An echo canceller as claimed in claim 20 wherein the value of $E_{max}$ is lowered if a transfer of coefficients has not taken place within a predetermined period of time.

24. An echo canceller as claimed in claim 20 wherein the value of $\hat{E}$ is an averaged value.

25. An echo canceller as claimed in claim 20 wherein the value of $\overline{E}$ is an averaged value.

26. An echo canceller comprising:
at least one input for receiving a far-end signal of a call;
at least one input for receiving a signal-plus-echo signal of the call, the signal-plus-echo signal having a signal component corresponding to an echo response of a transmission medium carrying the call;
a first digital filter receiving the far-end signal and having non-adaptive tap-coefficients to simulate the echo response;
a summer circuit for subtracting the filtered far-end output signal of the first digital filter from the signal-plus-echo signal to generate an echo compensated signal for transmission to a far-end;
a second digital filter receiving the far-end signal and having adaptive tap coefficients to simulate the echo response, the adaptive tap coefficients being updated during the call;
a coefficient transfer controller disposed to transfer the adaptive tap coefficients of the second digital filter to replace the tap coefficients of the first digital filter when $\hat{E}$ is greater than $\overline{E}$ and, concurrently, $\hat{E}$ is greater than $E_{max}$, wherein $\overline{E}$ corresponds to the ratio between a signal-plus-echo signal and a first echo compensated signal using the first digital filter, $\hat{E}$ corresponds to the ratio between the signal-plus-echo signal and a second echo compensated signal using the second digital filter, and $E_{max}$ corresponds to the largest $\hat{E}$ value experienced over at least a portion of the duration of the call.

27. An echo canceller as claimed in claim 26 wherein the value of $E_{max}$ is lowered if a transfer of coefficients has not taken place within a predetermined period of time.

28. An echo canceller as claimed in claim 26 wherein the value of $\hat{E}$ is an averaged value.

29. An echo canceller as claimed in claim 26 wherein the value of $\overline{E}$ is an averaged value.

30. An echo canceller comprising:
means for receiving a far-end signal of a call;
means for receiving a signal-plus-echo signal of the call including a signal component corresponding to an echo response of a transmission medium carrying the call;
first means comprising non-adaptive tap-coefficients for simulating the echo response;

means for subtracting the filtered far-end output signal of the first means from the signal-plus-echo signal to generate an echo compensated signal for transmission to a far-end;

second means comprising adaptive tap coefficients for simulating the echo response and for updating the adaptive tap coefficients during the call;

means for transferring the adaptive tap coefficients of the second means to replace the tap coefficients of the first means when $\hat{E}$ is greater than $\overline{E}$ and, concurrently, $\hat{E}$ is greater than $E_{max}$, wherein $\overline{E}$ corresponds to the ratio between a signal-plus-echo signal and a first echo compensated signal using the first means, $\hat{E}$ corresponds to the ratio between the signal-plus-echo signal and a second echo compensated signal using the second means, and $E_{max}$ corresponds to a larger than average $\hat{E}$ value experienced over at least a portion of the duration of the call.

31. An echo canceller as claimed in claim 30 wherein the value of $E_{max}$ is lowered if a transfer of coefficients has not taken place within a predetermined period of time.

32. An echo canceller as claimed in claim 30 wherein the value of $\hat{E}$ is an averaged value.

33. An echo canceller as claimed in claim 30 wherein the value of $\overline{E}$ is an averaged value.

34. A method for transferring tap coefficients between an adaptive digital filter and a non-adaptive digital filter of a dual-H echo canceller during a call comprising the steps of:

comparing a first value $\hat{E}$ with a second value $\overline{E}$, where $\overline{E}$ corresponds to the ratio between a signal-plus-echo signal and a first echo compensated signal using the non-adaptive digital filter of the echo canceller and wherein $\hat{E}$ corresponds to the ratio between the signal-plus-echo signal and a second echo compensated signal using the adaptive digital filter of the echo canceller;

comparing the value of $\hat{E}$ to a third value, $E_{max}$, wherein $E_{max}$ corresponds to the largest $\hat{E}$ value experienced over at least a portion of the duration of the call for which a transfer occurred;

transferring the adaptive tap coefficients of the adaptive digital filter to replace the tap coefficients of the non-adaptive digital filter when the value of $\hat{E}$ is greater than the value of $\overline{E}$ and, concurrently, the value of $\hat{E}$ is greater than the value of $E_{max}$.

35. A method as claimed in claim 34 and further comprising the step of lowering the value of $E_{max}$ if a transfer of coefficients has not taken place within a predetermined period of time.

36. A method as claimed in claim 35 wherein the value of $\hat{E}$ is an averaged value.

37. A method as claimed in claim 34 wherein the value of $\overline{E}$ is an averaged value.

38. A method of reducing an echo signal component of a local communication signal during a call, the echo signal component resulting from a far end communication signal, the method comprising:

filtering the communication signal using non-adaptive tap coefficients to generate a first estimated signal estimating the echo signal component;

filtering the communication signal using adaptive tap coefficients to generate a second estimated signal estimating the echo signal component;

updating the adaptive tap coefficients during the call;

combing the local communication signal including the echo signal component with the first estimated signal to generate a first echo compensated signal;

combining the local communication signal including the echo signal component with the second estimated signal to generate a second echo compensated signal; and transferring at least some of the adaptive tap coefficients to replace at least some of the non-adaptive tap coefficients when $\hat{E}$ is greater than $\overline{E}$ and, concurrently, $\hat{E}$ is greater than $E_{max}$, wherein $\overline{E}$ is derived from a ratio of the local communication signal including the echo signal component and the first echo compensated signal, $\hat{E}$ is derived from a ratio of the local communication signal including the echo signal component and the second echo compensated signal, and $E_{max}$ is derived from a larger than average $\hat{E}$ value experienced over at least a portion of the duration of the call during which a transfer occurred.

39. A method as claimed in claim 38 and further comprising the step of lowering value of $E_{max}$ if a transfer of coefficients has not taken place within a predetermined period of time.

40. A method as claimed in claim 38 wherein the value of $\hat{E}$ is an averaged value.

41. A method as claimed in claim 38 wherein the value of $\overline{E}$ is an averaged value.

42. A method as claimed in claim 38 wherein the combining the local communication signal including the echo signal component with the first estimated signal to generate a first echo compensated signal and the combining the local communication signal including the echo signal component with the second estimated signal to generate a second echo compensated signal both comprise arithmetic combining.

43. A method as claimed in claim 42 wherein the arithmetic combining comprises subtracting.

44. A method as claimed in claim 38, wherein the value of $E_{max}$ comprises the largest $\hat{E}$ value experienced over at least a portion of the duration of the call during which a transfer occurred.

45. An echo canceller for reducing an echo signal component of a local communication signal during a call, the echo signal component resulting from a far end communication signal, the canceller comprising a processor arranged to:

generate adaptive tap coefficients and non-adaptive tap coefficients;

filter the far end communication signal using the non-adaptive tap coefficients to generate a first estimated signal estimating the echo signal component;

filter the far end communication signal using the adaptive tap coefficients to generate a second estimated signal estimating the echo signal component;

update the adaptive tap coefficients during the call;

combine the local communication signal including the echo signal component with the first estimated signal to generate a first echo compensated signal and combine the local communication signal including the echo signal component with the second estimated signal to generate a second echo compensated signal; and transfer at least some of the adaptive tap coefficients to replace at least some of the non-adaptive tap coefficients when $\hat{E}$ is greater than $\overline{E}$ and, concurrently, $\hat{E}$ is greater than $E_{max}$, wherein $\overline{E}$ is derived from a ratio of the local communication signal including the echo signal component and the first echo compensated signal, $\hat{E}$ is derived from a ratio of the local communication signal including the echo signal component and the second echo compensated signal, and $E_{max}$ is derived from a larger than average $\hat{E}$ value experienced over at least a portion of the duration of the call during which a transfer occurred.

46. An echo canceller as claimed in claim 45 wherein the value of $E_{max}$ is lowered if a transfer of coefficients has not taken place within a predetermined period of time.

47. An echo canceller as claimed in claim 45 wherein the value of $\hat{E}$ comprises an averaged value.

48. An echo canceller as claimed in claim 45 wherein the value of $\overline{E}$ comprises an averaged value.

49. An echo canceller as claimed in claim 45 wherein the $E_{max}$ value comprises the largest $\hat{E}$ value experienced over at least a portion of the duration of the call during which a transfer occurred.

50. An echo canceller as claimed in claim 45 wherein the processor uses an arithmetic process to generate the first echo compensated signal and second echo compensated signal.

51. An echo canceller as claimed in claim 50 wherein the arithmetic process comprises a subtraction process.

* * * * *

UNITED STATES PATENT AND TRADEMARK OFFICE
CERTIFICATE OF CORRECTION

PATENT NO.   : 6,337,907 B1
DATED        : January 8, 2002
INVENTOR(S)  : Kenneth P. Laberteaux and Richard C. Younce It is certified that error appears in the above-identified patent and that said Letters Patent is hereby corrected as shown below:

Column 4,
Line 22, the letter "h" should read -- $\bar{h}$ --.
Line 53, in the formula, the lower case "$e$" should read -- $\bar{e}$ --.

Signed and Sealed this

Twenty-first Day of January, 2003

JAMES E. ROGAN
*Director of the United States Patent and Trademark Office*